(12) United States Patent
Kenagy

(10) Patent No.: US 8,600,291 B2
(45) Date of Patent: Dec. 3, 2013

(54) MULTIPLE SERVICE MANAGEMENT

(75) Inventor: Jason B. Kenagy, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 591 days.

(21) Appl. No.: 12/469,526

(22) Filed: May 20, 2009

(65) Prior Publication Data

US 2010/0203822 A1 Aug. 12, 2010

Related U.S. Application Data

(60) Provisional application No. 61/152,139, filed on Feb. 12, 2009.

(51) Int. Cl.
*H04H 20/71* (2008.01)
*H04H 60/33* (2008.01)

(52) U.S. Cl.
USPC ............. 455/3.01; 455/2.01; 725/22; 725/32; 725/9; 725/19

(58) Field of Classification Search
USPC ................... 455/2.01, 3.01; 725/22, 32, 9, 19
See application file for complete search history.

(56) References Cited

U.S. PATENT DOCUMENTS

| | | | | |
|---|---|---|---|---|
| 7,240,354 B2 * | 7/2007 | Fellenstein et al. | ............. | 725/28 |
| 7,298,962 B2 * | 11/2007 | Quan et al. | ..................... | 386/251 |
| 7,623,823 B2 * | 11/2009 | Zito et al. | ..................... | 455/2.01 |
| 8,358,909 B2 * | 1/2013 | Allard | ........................... | 386/248 |
| 8,358,966 B2 * | 1/2013 | Zito et al. | ..................... | 455/2.01 |
| 8,370,892 B2 * | 2/2013 | Shelton et al. | ................. | 725/136 |
| 2003/0014747 A1 * | 1/2003 | Spehr | ............................... | 725/22 |
| 2003/0163832 A1 | 8/2003 | Tsuria et al. | | |
| 2007/0124757 A1 * | 5/2007 | Breen | .............................. | 725/18 |
| 2008/0201361 A1 * | 8/2008 | Castro et al. | ............. | 707/103 R |
| 2009/0204488 A1 * | 8/2009 | Leviev-Cohen | ................. | 705/14 |
| 2009/0228912 A1 * | 9/2009 | Reynolds et al. | ................ | 725/25 |
| 2009/0249418 A1 * | 10/2009 | Alastruey Gracia et al. | . | 725/114 |
| 2011/0138022 A1 * | 6/2011 | Xie et al. | ....................... | 709/219 |
| 2011/0251890 A1 * | 10/2011 | Xu | .............................. | 705/14.44 |
| 2012/0042250 A1 * | 2/2012 | Hartwig et al. | ............... | 715/719 |

FOREIGN PATENT DOCUMENTS

| | | |
|---|---|---|
| DE | 19925387 | 12/2000 |
| JP | 2001298512 A | 10/2001 |
| JP | 2006033691 A | 2/2006 |
| JP | 2009253937 A | 10/2009 |

OTHER PUBLICATIONS

International Search Report—PCT/US2010/023828, International Search Authority—European Patent Office—May 28, 2010.
International Search Report, PCT/US2010/023828, International Searching Authority, European Patent Office, Jun. 7, 2010.
Written Opinion, PCT/US2010/023828, International Searching Authority, European Patent Office, Jun. 7, 2010.

* cited by examiner

*Primary Examiner* — Bobbak Safaipour
(74) *Attorney, Agent, or Firm* — The Marbury Law Group, PLLC

(57) ABSTRACT

An opportunity can arise while a user is engaging a first multimedia service, commonly when the service is engaged upon a personal electronic device. A trigger can have the first multimedia service changed to an alternative service based upon the opportunity. Upon completion of the opportunity, there can be an automatic return to the first service or a request to the user on how to leave the opportunity. In addition, a notice can transfer to the user that the opportunity is coming to an end and a request can be made for the user to determine how to proceed from the opportunity or that the opportunity is ending.

50 Claims, 14 Drawing Sheets

MULTIPLE SERVICE MANAGEMENT

CROSS REFERENCE TO RELATED PATENT APPLICATIONS

This application is a non-provisional application which claims the benefit of priority of U.S. Provisional Patent Application Ser. No.: 61/152,139, entitled "Multiple Service Management" filed on Feb. 12, 2009.

BACKGROUND

Wireless communication systems are widely deployed to provide various types of communication content such as, for example, voice, data, and so on. Typical wireless communication systems can be multiple-access systems capable of supporting communication with multiple users by sharing available system resources (e.g., bandwidth, transmit power, . . . ). Examples of such multiple-access systems can include code division multiple access (CDMA) systems, time division multiple access (TDMA) systems, frequency division multiple access (FDMA) systems, orthogonal frequency division multiple access (OFDMA) systems, and the like.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations can be established via single-input single-output (SISO) systems, multiple-input single-output (MISO) systems, multiple-input multiple-output (MIMO) systems, and so forth.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A method can be used for management of multimedia services operable upon a wireless communication device. The method can include identifying a break opportunity corresponding to a first multimedia service and enabling at least one alternative multimedia service based upon the identified break opportunity.

There can be at least one processor configured for multimedia management. The processor can include a module for identifying a break opportunity corresponding to a first multimedia service. Moreover, the processor can also include a module for enabling at least one alternative multimedia service based upon the identified break opportunity.

A computer program product can be used that includes a computer-readable medium. The medium can include a code set for causing a computer to identify a break opportunity corresponding to a first multimedia service. In addition, a code set can be included for causing a computer to enable at least one alternative multimedia service based upon the identified break opportunity.

An apparatus can be used that includes means for identifying a break opportunity corresponding to a first multimedia service. Moreover, the apparatus can include means for enabling at least one alternative multimedia service based upon the identified break opportunity.

Another apparatus can also be used, this apparatus can include a classifier that identifies a break opportunity corresponding to a first multimedia service. In addition, the apparatus can include a trigger that enables at least one alternative multimedia service based upon the identified break opportunity.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects can be employed, and this description is intended to include all such aspects and their equivalents.

DETAILED DESCRIPTION

Figure 1:
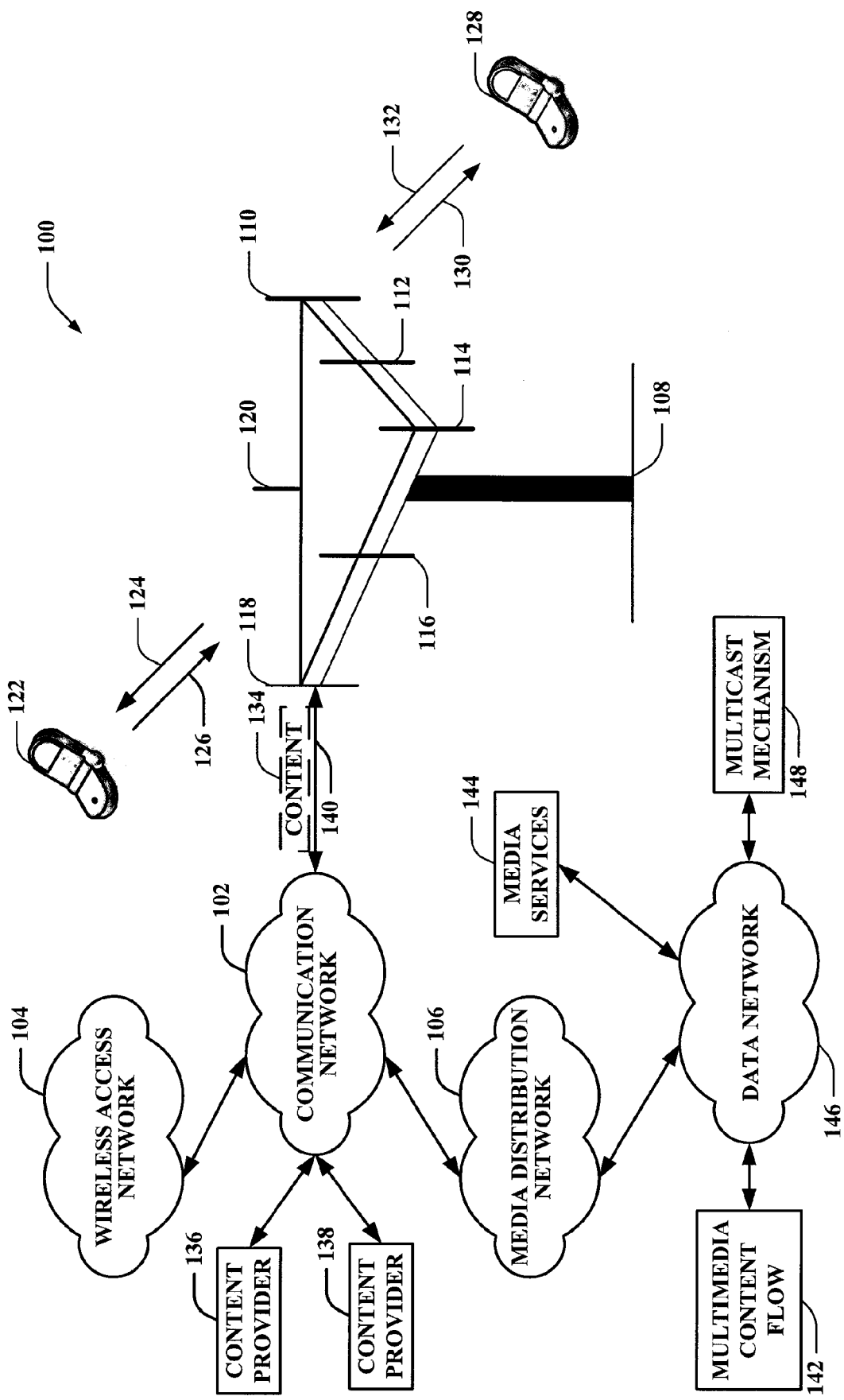
FIG. 1 is an illustration of a wireless communication system in accordance with various aspects set forth herein.

Various aspects are now described with reference to the drawings, wherein like reference numerals are used to refer to like elements throughout. In the following description, for purposes of explanation, numerous specific details are set forth in order to provide a thorough understanding of one or more aspects. It can be evident, however, that such aspect(s) can be practiced without these specific details. In other instances, well-known structures and devices are shown in block diagram form in order to facilitate describing one or more embodiments.

As used in this application, the terms "component," "module," "system" and the like are intended to include a computer-related entity, such as but not limited to hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal can be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station can be utilized for communicating with wireless terminal(s) and can also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The techniques described herein can be used for various wireless communication systems such as CDMA, TDMA, FDMA, OFDMA, SC-FDMA and other systems. The terms "system" and "network" are often used interchangeably. A CDMA system can implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM□, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to FIG. 1, a wireless communication system 100 is illustrated in accordance with various embodiments presented herein. In some aspects, a communication network 102 comprises a wireless access network 104 operable to enable wireless communications and a media distribution network 106 operable to distribute a plurality of content 134 to a plurality of wireless devices, including wireless devices 122 and 128. System 100 comprises a base station 108 that can include multiple antenna groups. For example, one antenna group can include antennas 110 and 112, another group can comprise antennas 114 and 116, and an additional group can include antennas 118 and 120. Two antennas are illustrated for each antenna group; however, more or fewer antennas can be utilized for each group. Base station 108 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 108 can communicate with one or more mobile devices such as mobile device 122 and mobile device 128; however, it is to be appreciated that base station 108 can communicate with substantially any number of mobile devices similar to mobile devices 122 and 128. Mobile devices 122 and 128 can be, for example, cellular phones, smart phones, laptops, handheld communication devices, handheld computing devices, satellite radios, global positioning systems, PDAs, and/or any other suitable device for communicating over wireless communication system 100. As depicted, mobile device 122 is in communication with antennas 118 and 120, where antennas 118 and 120 transmit information to mobile device 122 over a forward link 124 and receive information from mobile device 122 over a reverse link 126. Moreover, mobile device 128 is in communication with antennas 110 and 112, where antennas 110 and 112 transmit information to mobile device 128 over a forward link 130 and receive information from mobile device 128 over a reverse link 132. In a frequency division duplex (FDD) system, forward link 124 can utilize a different frequency band than that used by reverse link 126, and forward link 130 can employ a different frequency band than that employed by reverse link 132, for example. Further, in a time division duplex (TDD) system, forward link 124 and reverse link 126 can utilize a common frequency band and forward link 130 and reverse link 132 can utilize a common frequency band.

The set of antennas and/or the area in which they are designated to communicate can be referred to as a sector of base station 108. For example, multiple antennas can be designed to communicate to mobile devices in a sector of the areas covered by base station 108. In communication over forward links 124 and 130, the transmitting antennas of base station 108 can utilize beamforming to improve signal-to-noise ratio of forward links 124 and 130 for mobile devices 122 and 128. Also, while base station 108 utilizes beamforming to transmit to mobile devices 122 and 128 scattered randomly through an associated coverage, mobile devices in neighboring cells can be subject to less interference as compared to a base station transmitting through a single antenna to all its mobile devices.

Further, communication network 102 comprises one or more content providers 136, 138 operable to provide all or some portion of the plurality of content 134 for distribution to users in network 102. For example, the plurality of content 134 supplied by content providers 136, 138 may comprise at least one of video, audio, multimedia content, real-time content, non real-time content also referred to as "clips," scripts, programs, data or any other type of suitable content. The plurality of content 24 may include one or any combination of subscribed to programming, ad hoc and/or on-demand programming, advertising and any other form of content presented during a break within and/or simultaneously with other content. In some aspects, content providers 136,138 communicate with the media distribution system 106 via a communication link 140, which may comprise any suitable type of wired and/or wireless communication interface.

In some aspects, media distribution network 106 may comprise a transport system that operates to create and transport a multimedia content flow 142, including one or more media services 144, across one or more data network 146. For example, such a transport system may include a multicast mechanism 148. In some aspects of multicasting, each flow 142 is a logical stream within a "multiplex," which is a set of flows available in a given geographical area. For example, multicast mechanism 148 may comprise all or some portion of a multicast system such as a Forward Link Only (FLO) network, including the MEDIAFLO™ System available from Qualcomm, Inc. of San Diego, Calif. Further, media service 144 comprises one or some combination of the plurality of content 134, where a media service customized for a specific retailer may be referred to as a "channel." As such, each flow 142 is able to deliver the same service 144 to a plurality of endpoints at the same time, as the flow is available to any device tuning in to the proper frequency, thereby avoiding scalability issues. Therefore, media distribution network 106 may be operable to transport media content in a one-to-many fashion. MEDIAFLO™ is one example of a broadcast network, and that other examples may include DVB-H (Digital Video Broadcasting—Handheld) and T-DMB (Terrestrial-Digital Multimedia Broadcast) systems; additionally, multicast networks can be used in accordance with aspects disclosed herein.

Figure 2:
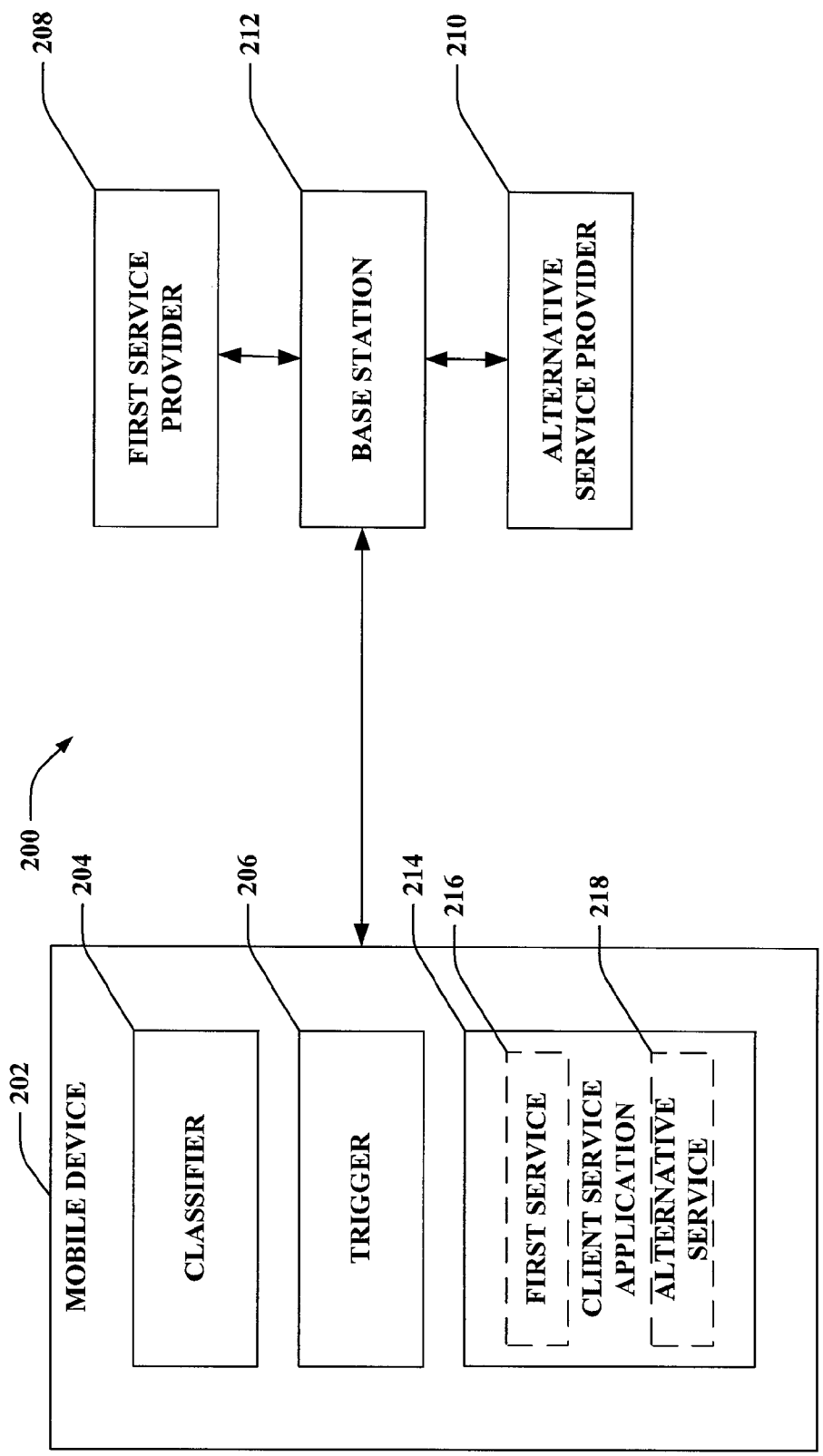
FIG. 2 is an illustration of a representative detailed mobile device that manages multiple services in accordance with aspects disclosed herein.

Referring now to FIG. 2, an example system 200 is disclosed for managing different services, commonly upon a mobile device 202. With greater complexity of personal electronic devices (e.g., the mobile device 202) and with an ability to provide for different services (e.g., watching television, opening an Internet browser, enabling text messaging, enabling voice and/or video communication etc.), there can be a greater desire to manage services upon the devices. For example, the mobile device 202 can be used to watch television (TV). During a commercial break, a user can desire to use a text message capability of the mobile device 202 and thus there can be a switching of services (e.g., from a first service—television—to an alternative service—text messaging). Multiple problems can arise regarding the switching of services, including from a user perspective and from a service provider perspective.

From a service provider prospective, there are several difficulties in a user engaging in different services. First, advertisers that commonly pay a large sum of money can be shut out of their advertisement opportunity (e.g., a chance to disclosed an advertisement to a user in order to leave an impression with the user). For example, if a commercial for an advertiser runs at an opportunity and a user switches to another service, then the advertisement opportunity can be lost since the user is no longer engaging a service associated with the opportunity. In addition, since the user engages another service, there is no guarantee that the user returns to the first service, thus more opportunities (e.g., future opportunities) can be lost.

Likewise, a user can desire to return to a first service (e.g., a television program), but forget due to the engagement of a supplemental service (e.g., conversation with a friend). Therefore, a classifier 204 can be used that identifies an opportunity (e.g., a break opportunity, such as a commercial break) corresponding to a first multimedia service. Additionally, there can be use of a trigger 206 that enables at least one alternative multimedia service (e.g., enables a service to be engaged by a user) based upon the identified opportunity. The enablement can be qualified such that a return notice is produced for the user to return to the first service and/or that the opportunity be utilized even with the alternative service (e.g., modify an advertisement to audio when the alternative service occupies video capabilities). The first service can be provided from a first service provider 208 while an alternative service can be provided from an alternative service provider 210—however, it is possible that multiple services be provided from a single service provider. Additionally, a base station 212 can be used to facilitate communication with the mobile device 202 and the service providers 208 and 210.

While disclosing a user with a personal electronic device (e.g., mobile device 202), it is to be appreciated that aspects disclosed herein can be used in accordance with other devices (e.g., a desktop computer). In addition, multiple devices can be used in coordination with one another. For example, if an opportunity is identified with a television show on a television set, the mobile device 202 can have a text message application enabled. In addition, the television set can be automatically modified (e.g., muted so an application on the mobile device 202 can be heard). It is also to be appreciated that the classifier 204 and/or trigger 206 can at least partially reside upon units other than the mobile device 202 (e.g., an independent device that communicates with the mobile device 202 and/or base station 204). A client service application 214 can be used to facilitate the mobile device 202 using different network side services (e.g., the first service provider 208, the alternative service provider 210, etc.) executing different client service applications (e.g., first service 216, alternative service 218, etc.).

Figure 3:
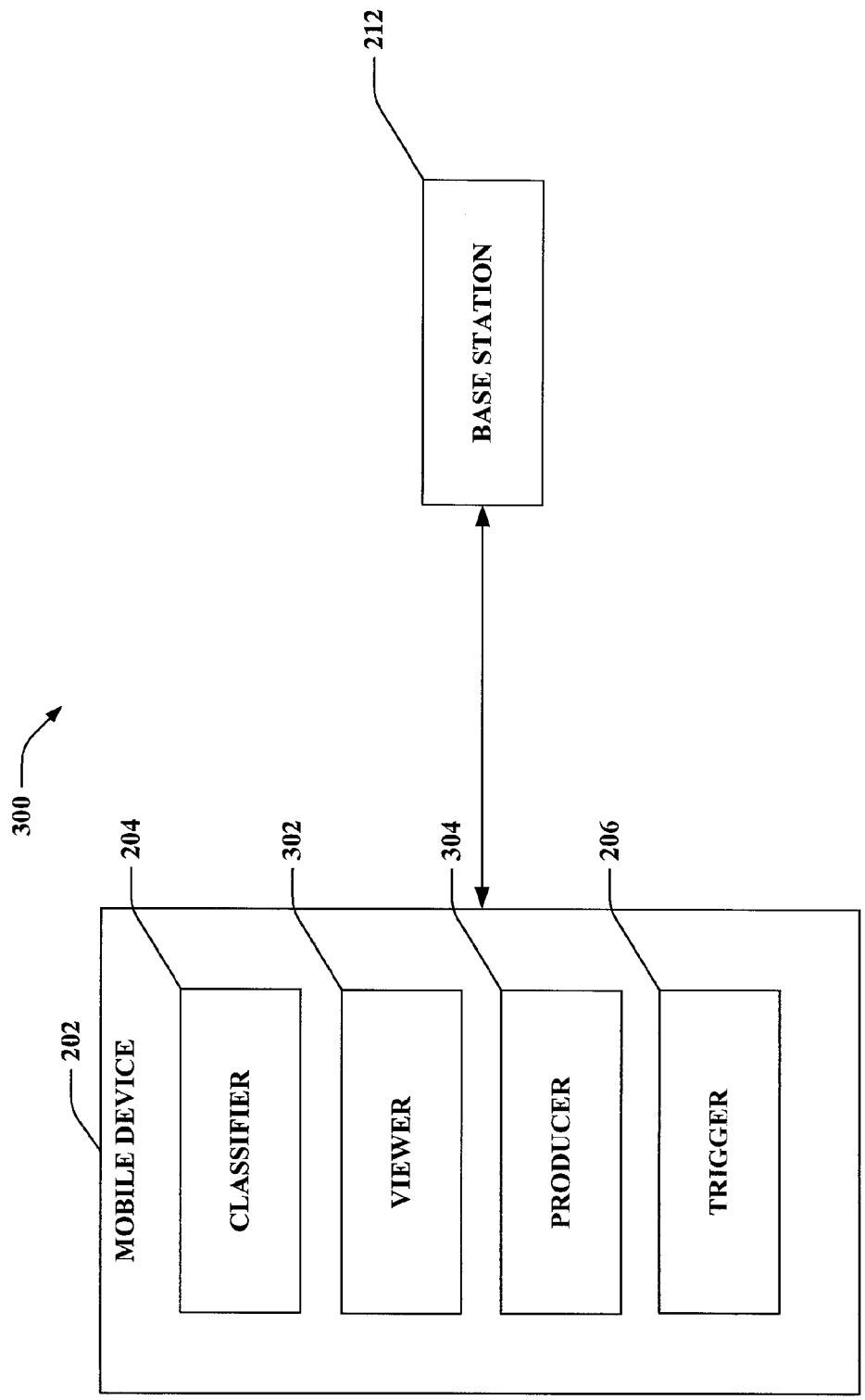
FIG. 3 is an illustration of a representative mobile device that interacts with a user concerning management of multiple multimedia services in accordance with aspects disclosed herein.

Referring to FIG. 3, an example system 300 is disclosed for determining an alternative service to use and/or determining if an alternative service should be used. A mobile device 202 can communicate with a base station 212 to communicate information. A classifier 204 can be used to determine an opportunity to use an alternative service (e.g., using the alternative service in place of another service).

It can be possible that a relatively large number of alternative services can be available. For instance, a first service can be TV, while potential alternative services can be use of an Internet browser, a text message application, listening to voicemail, engaging in a voice conversation, etc. Since it is likely that less then all services are to be used as an alternative service, a viewer 302 can be used that determines at least one alternative multimedia service to enable if appropriate—and also determine services not to enable if appropriate.

According to one embodiment, the viewer 302 can automatically determine a service to be used, such as through use of artificial intelligence techniques. In one example, a user can historically use a voicemail checking service when there is a voicemail and a show is at a commercial break—due to the history, the voicemail service can be automatically enabled. In addition, contextual information can be used to determine a service to enable. If a user is watching a TV program that encourages viewers to vote for contestants through sending a text message, then the text messaging service can automatically be enabled during an opportunity associated with the TV program. Automatic enablement can be overridden by a user (e.g., through use of an interface provided by a producer 304) and/or disabled.

It is to be appreciated that artificial intelligence techniques can be used to practice determinations and inferences disclosed in the subject specification. These techniques employ one of numerous methodologies for learning from data and then drawing inferences and/or making determinations related to dynamically storing information across multiple storage units (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. These techniques can also include methods for capture of logical relationships such as theorem provers or more heuristic rule-based expert systems. These techniques can be represented as an externally pluggable module, in some cases designed by a disparate (third) party.

As opposed to automatically providing an alternative service, a user can be engaged to provide direction on what alternative services to enable. A producer 304 can be used that generates an interface that enables selection of at least one of at least two enabled alternative multimedia services (e.g., at least two services are provided for selection). A user can make a selection and a trigger 206 can enable the selection and/or the trigger 206 can automatically enable an alternative service determined by the viewer 302. Alternative embodiments can be practiced, such as a user selecting an alternative service manually (e.g., without an interface, such as through a voice command) or the alternative service being determined by a third party (e.g., the TV program enabling the text message service automatically after obtaining user consent).

Figure 4:
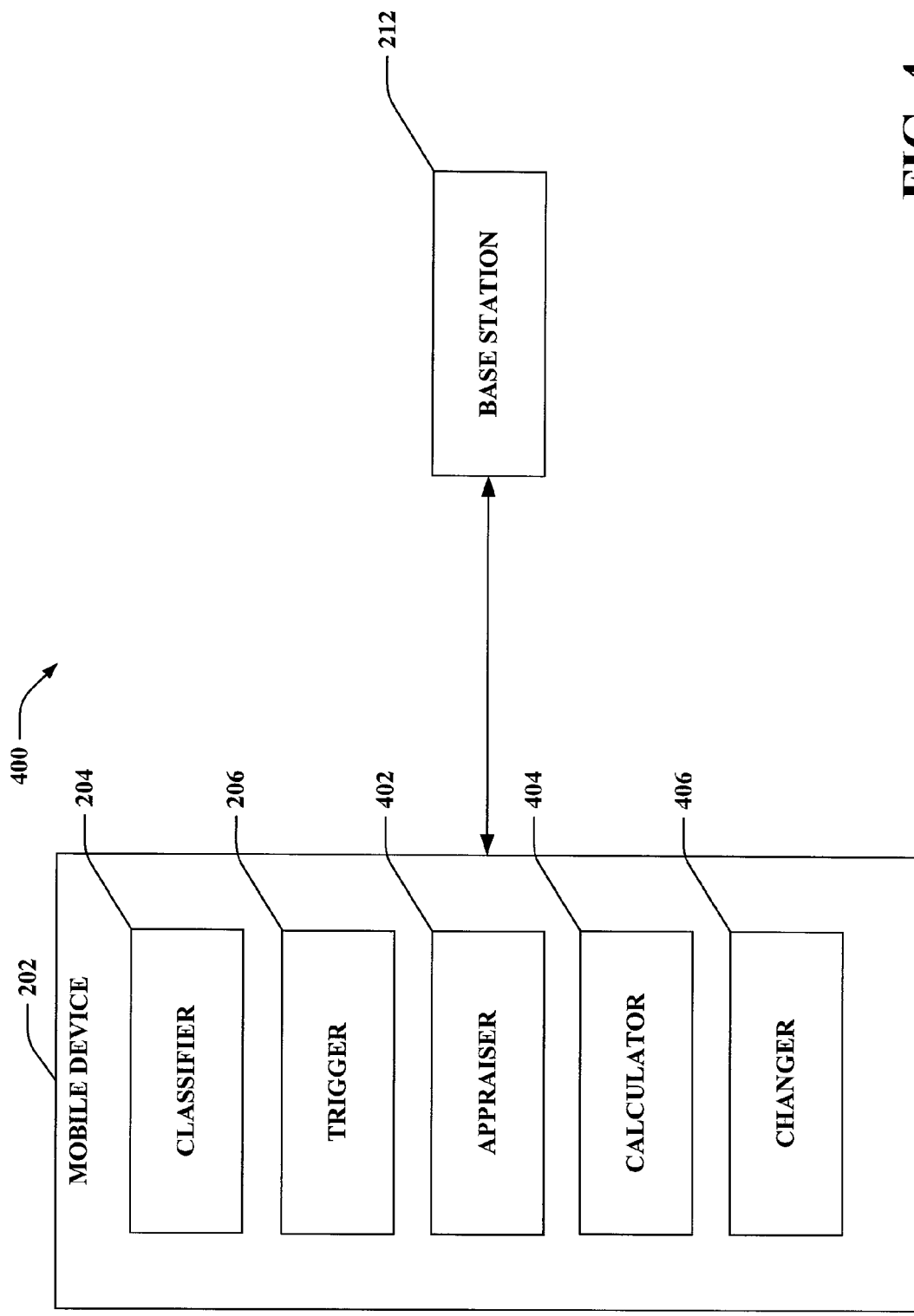
FIG. 4 is an illustration of a representative modification configuration for a mobile device in accordance with aspects disclosed herein.

Now referring to FIG. 4, an example system 400 is disclosed for modifying information in relation to an alternative service. A mobile device 202 (e.g., mobile TV) can communicate with a base station 212 to facilitate information transfer. A user can run a service upon the mobile device 202, such as a TV service with scheduled commercial breaks. An opportunity (e.g., an opportunity to disclose to a user advertisement content, an opportunity to use an alternative service, etc.) can arise and a classifier 204 can identify the opportunity (e.g., identification from a signal sent from a service provider, from optical scanning of a display, etc.). A determination can be made on what alternative service to use during the opportunity and a trigger 206 can enable the determined alternative service.

Since a user can engage an alternative service, an opportunity to disclose an advertisement as part of the first service can be lost. The mobile device 202 can operate in order to modify the advertisement such that a user is still exposed to desirable content. An appraiser 402 can be used by the mobile device 202 that evaluates the at least one alternative multimedia service (e.g., evaluates with regard to how use of the alternative service influences the opportunity and/or advertisement). In addition, the appraiser 402 can evaluate the first service, the advertisement, contextual information, and the like—results of the evaluation can be used by the mobile device in service management.

A calculator 404 can be used that determines a manner of engagement for the at least one alternative multimedia service. For example, if the alternative service is determined to be a text message service, then a determination can be made that the alternative service is engaged through use of a keyboard and screen. A determination can be made (e.g., by the appraiser 402) on how the first service should be modified in order for the advertisement to leave an impression. A changer 406 can be employed that establishes a modification of the first multimedia service such that the opportunity leaves an impression (e.g., content is still appreciated by a user).

Continuing the example when the alternative service is a text message service, a user can engage the mobile device to watch a TV program. When a commercial break (e.g., the opportunity) arises, the user can switch to the text message service. The appraiser 402 can evaluate the text message service and the calculator 404 can determine that visual aspects of the advertisement are not appreciated based upon a result of the evaluation since the screen is occupied with the text message application or will be occupied if performed in anticipation. An advertisement can be modified by the changer 406 such that audio is played since visual aspects are not appreciated due to the text message service. Modification can function such that audio of an original advertisement is played, a specially designed audio-only advertisement is played (e.g., designed for radio broadcast), etc.

Figure 5:
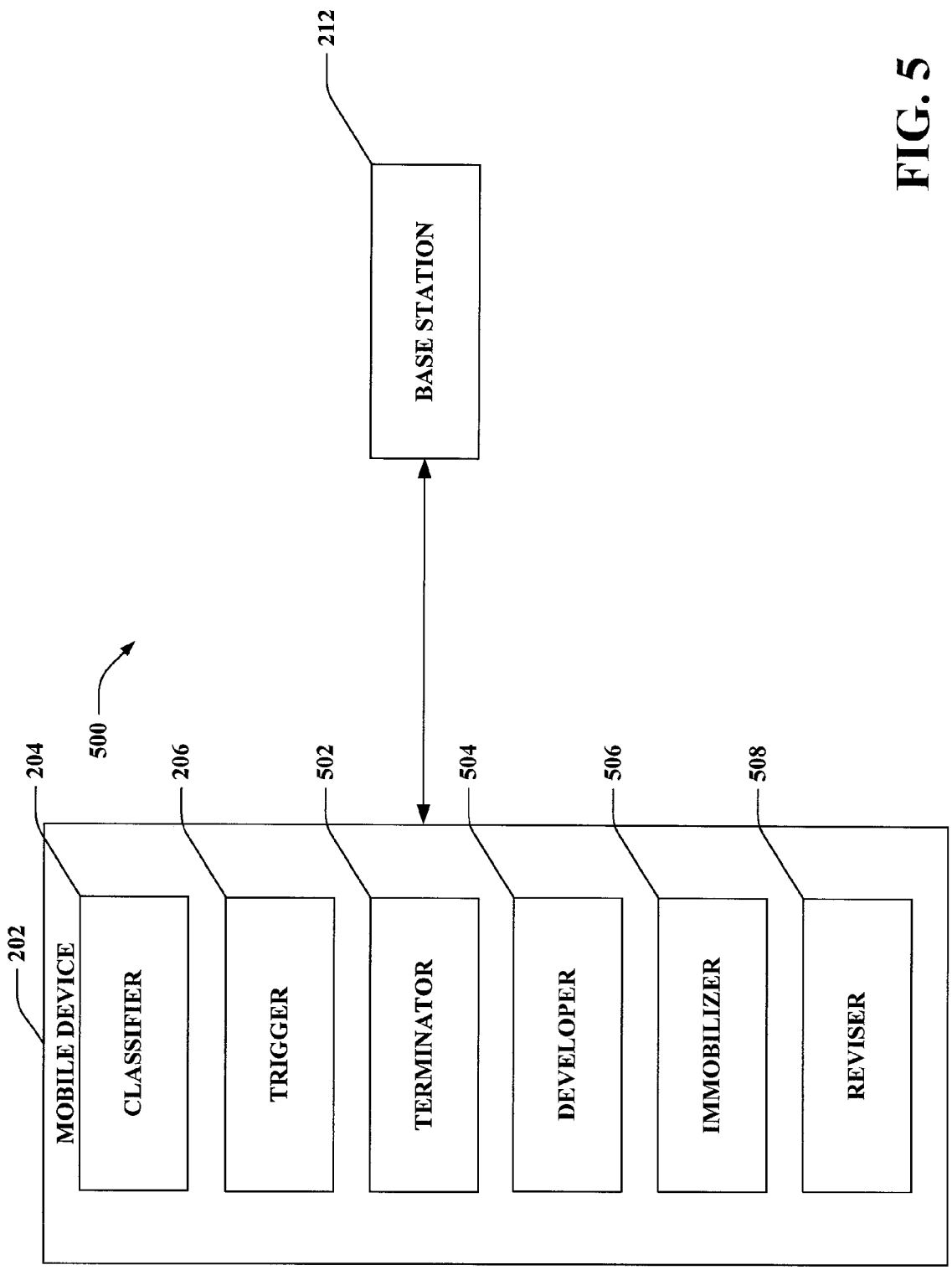
FIG. 5 is an illustration of a representative mobile device with a navigation configuration in accordance with aspects disclosed herein.

Now referring to FIG. 5, an example system 500 is disclosed for navigating through different multimedia services (e.g., TV, streamed video, streamed music, etc.), commonly operating upon a mobile device 202. The mobile device 202 can communicate with a base station 204 to facilitate engagement with different services. A classifier 204 can identify an opportunity concerning a first multimedia service and a trigger 206 can enable an alternative service to operation at least during the identified opportunity.

When an opportunity ends (e.g., end of a commercial break period), there can be a desire from multiple parties for a first service to resume. A service provider could have advertisements during other opportunities that the provider desires for the user to view and the user can desire to continue with the first service after the opportunity ends. A terminator 502 can be used that identifies an end of the opportunity (e.g., through observation of the first multimedia service while a user engages an alternative multimedia service).

A developer 504 can determine how to proceed with regard to the at least one alternative multimedia service and the first multimedia service. For example, the determination can be automatically made that the first multimedia service should be resumed upon the identified end. As a different embodiment, the determination can be made that the user should be asked if the first service should be returned to or if the alternative service should continue until an alternative instruction is provided from the user. In addition, the first service can be dominant such that the first service devices when the alternative service should be overridden, such as at the end of the opportunity.

Upon determining that the first multimedia service should be resumed, an immobilizer 506 can be used that disables the at least one enabled alternative multimedia service. A check can be performed to determine if the disablement is successfully accomplished and a reviser 508 can be used that returns to the first multimedia service, such as upon a positive determination. If disablement is not successfully accomplished, subsequent attempts can be made.

Figure 6:
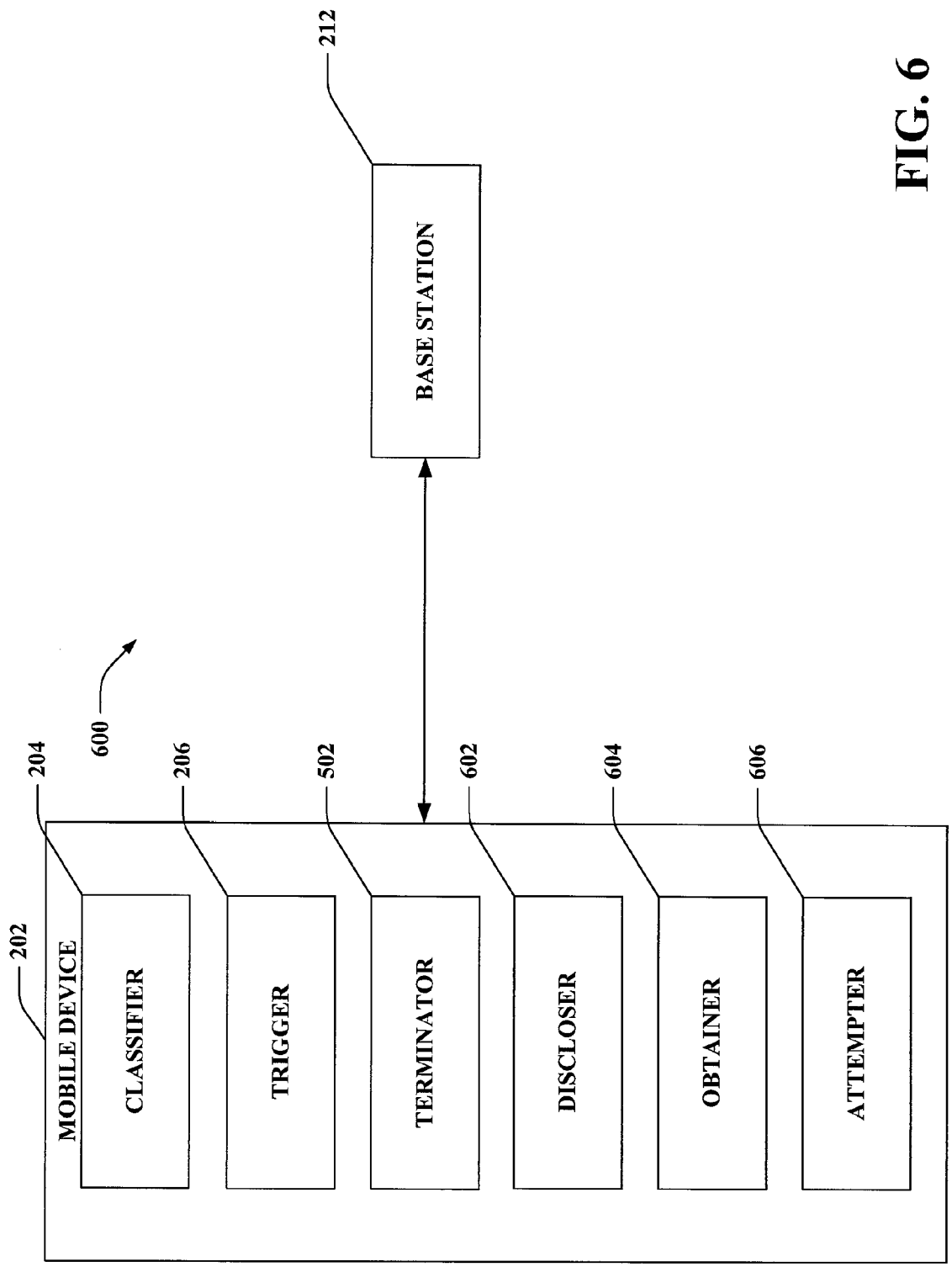
FIG. 6 is an illustration of a representative user engaged return configuration for a mobile device in accordance with aspects disclosed herein.

Now referring to FIG. 6, an example system 600 is disclosed for soliciting information from a user concerning management of multimedia services. A mobile device 202 can have services relayed through a base station 212. A service can have an opportunity for another service to be used and a classifier 204 can identify the opportunity. An alternative service can be designated for use during the opportunity and a trigger 206 can enable (e.g., allow the alternative service to be used) the designated alternative service. A terminator 502 can monitor operation of the first multimedia service and/or alternative multimedia service and based upon the monitoring identify an end of the opportunity.

The producer 304 of FIG. 3 can generate an interface (e.g., video touchpad, voice interface, etc.) and a discloser 602 can present the interface to a user that includes at least two choices (e.g., return to the first service, terminate operation, set a reminder timer, etc.). A user can select one or more choices (e.g., all choices, more than one choice yet not all choices, etc.) through use of the interface. According to one implementation, the interface is customized by the user prior to generation (e.g., color scheme, size of buttons, choices available, and the like).

Figure 7:
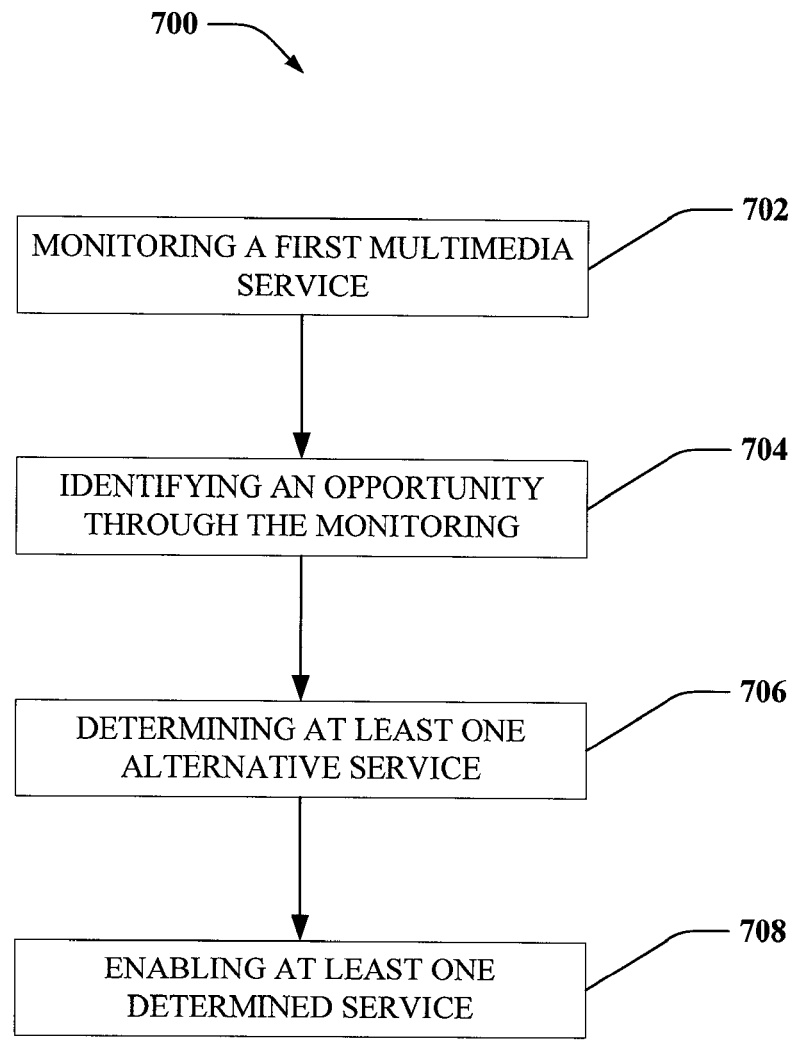
FIG. 7 is an illustration of a representative methodology for managing services upon a mobile device in accordance with aspects disclosed herein.

An obtainer 604 can monitor usage of the interface and collect an instruction on how to proceed. According to one embodiment, the user selects a choice presented through the interface, where the choice corresponds to an instruction. An attempter 606 can evaluate the instruction to determine how to proceed and follow the instruction if applicable. According to one implementation, the interface encourages a user to speak an instruction (e.g., the interface is an audio suggestion). The spoken instruction can be evaluated to determine what is intended. If what is intended can be determined, then the instruction can be followed; if what is intended cannot be determined, then a request for new input can be requested. Thus, the user can choose how to respond to the end of break state signal from the broadcaster (e.g., return to program, notify me and wait, or wait until my task is completed). In another implementation, a service provider selects preferences by reference to the program being broadcast or through a global set of rules (e.g., one or more rules). For example, during a dance contest, the broadcaster can direct users to their text messaging application so that they can chat about the contestants. Therefore, users can be allowed to perform lightweight tasks while still being served with an advertisement and without exiting a mobile TV application. Also, the aspects can be used for recorded or clip functionality (e.g., digital video recording) where commercial fast forwarding is disabled, but a break state is provided during commercial breaks Referring to FIG. 7, an example methodology 700 is disclosed for managing multimedia services, commonly upon a mobile device. A first multimedia service can be monitored at action 702 in order to attempt to discover an opportunity for an alternative service to be used. At event 704, there can be identifying an opportunity of a first multimedia service, such as through obtaining a signal sent from a provider of the first multimedia service. Contextual information can be collected and analyzed—based upon a result of the analysis there can be determining at least one alternative multimedia service to enable through act 706. Based upon the determination, there can be at event 708 enabling at least one alternative multimedia service based upon the identified opportunity.

Figure 8:
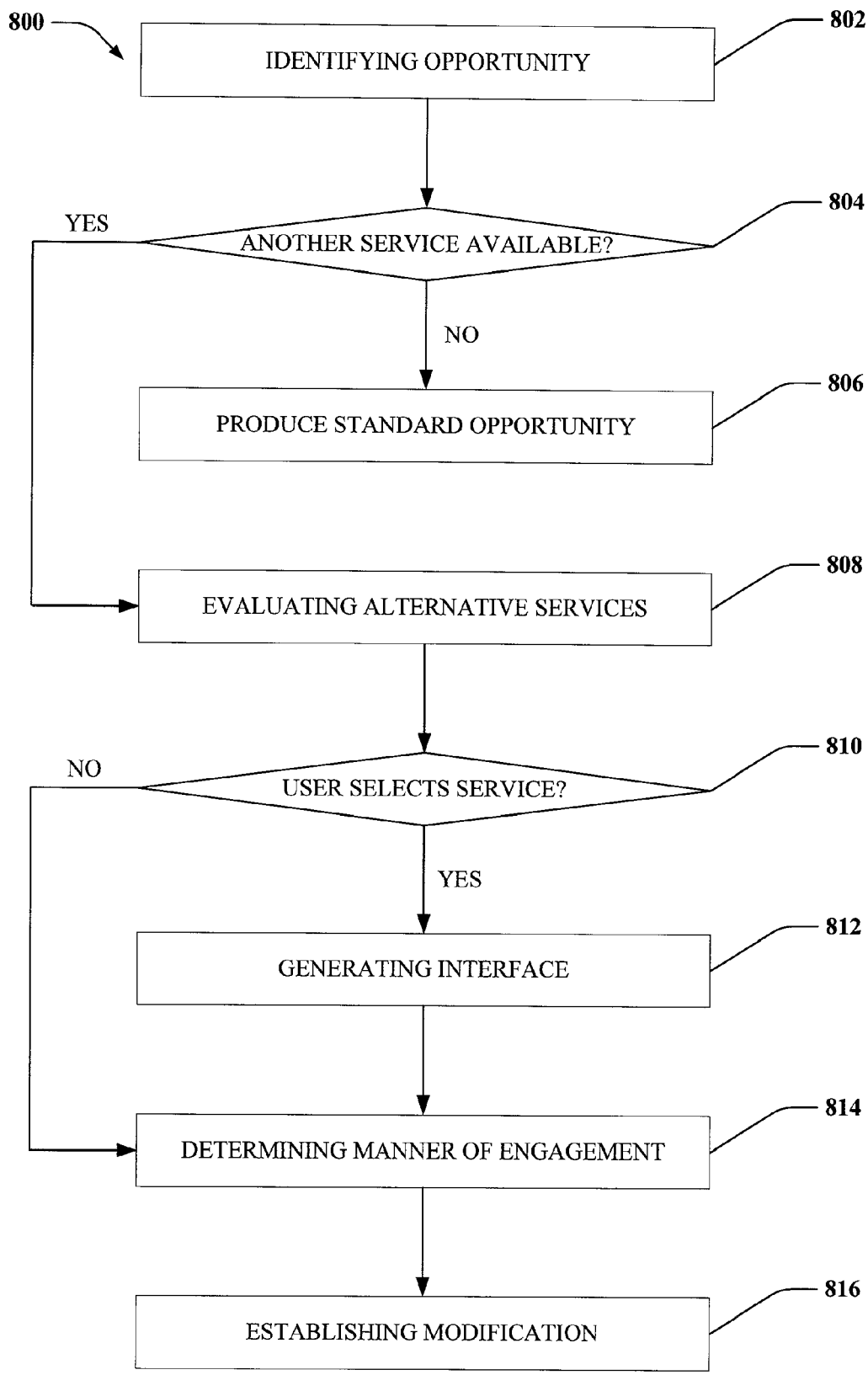
FIG. 8 is an illustration of a representative user interaction methodology concerning using different services with a mobile device in accordance with aspects disclosed herein.

Referring to FIG. 8, an example methodology 800 is disclosed for processing service management, commonly upon a mobile device. At action 802, there can be identifying an opportunity to use an alternative service in lieu of a first service. A check 804 can be performed to determine if another service should be used during the opportunity. The check 804 can function to determine if there is another service available, if another service should be used, and the like. For example, the check 804 can measure capabilities of a hosting mobile device and determine if a service can run on the device. If it is determined that another service should not be used, then a standard opportunity can be disclosed at event 806 (e.g., a regular TV commercial can run).

If the check 804 determines that there is an available service, then an evaluation of the services can occur through action 808. A check 810 can take place to determine if the user should select the alternative service. If the user should select the alternative service, then an interface can be generated through act 812 to facilitate selection. However, if the user should not select an alternative service, then automatic selection can occur. Regardless on how selection occurs, there can be a determination made on how a user engages the alternative service through event 814. This can be done through predictive analysis, historical analysis, requesting from a service provider how engagement commonly occurs, etc. A modification of original information (e.g., an advertisement) based upon a result of the determined manner can occur at act 816.

Figure 9:
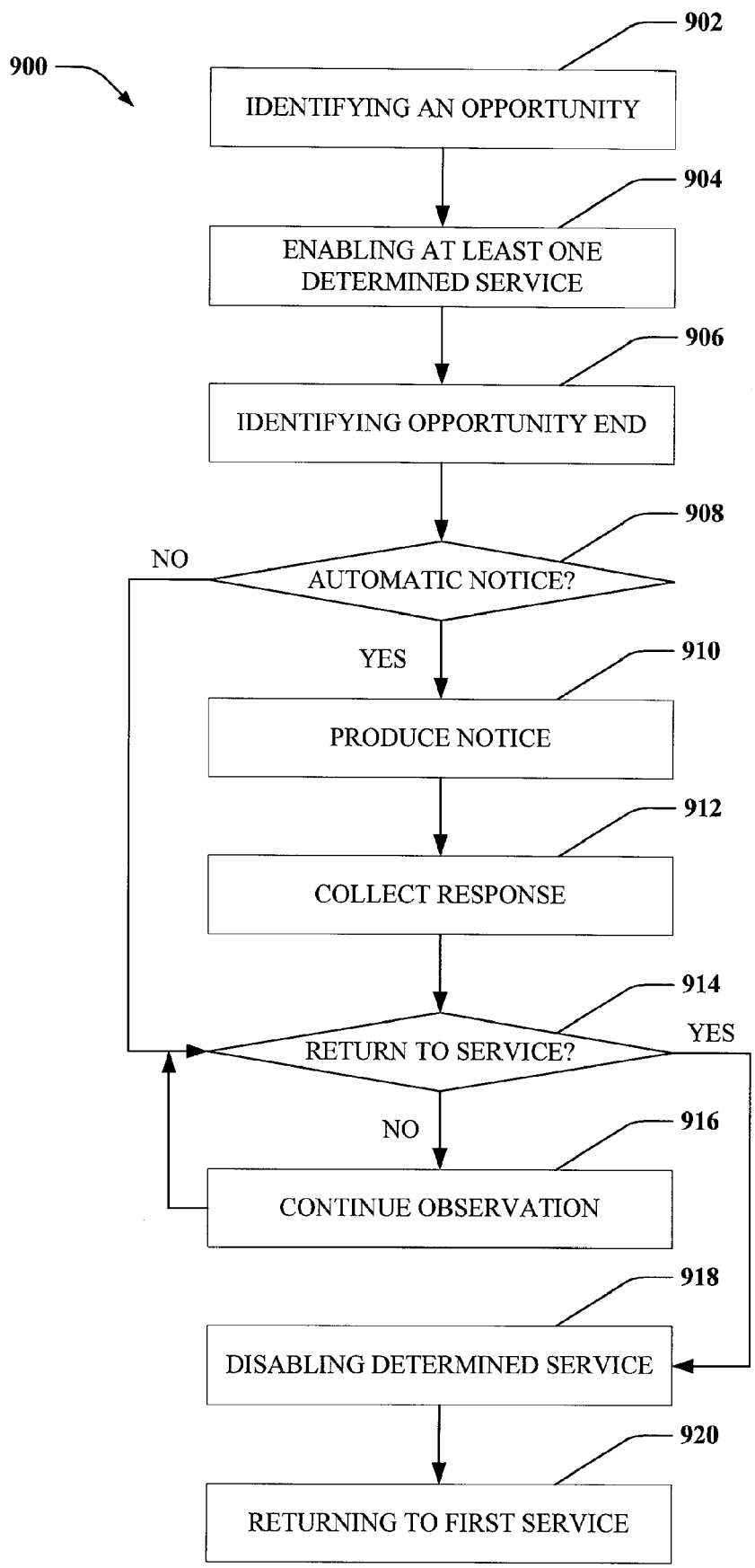
FIG. 9 is an illustration of a representative methodology for returning to a service in accordance with aspects disclosed herein.

Referring to FIG. 9, an example methodology 900 is disclosed for processing information related to multimedia services. An opportunity to use an alternative service can be identified at action 902. An alternative service can be enabled at event 904 such that the alternative service can be used during the opportunity. The opportunity can be monitored such that there can be an identification of when the opportunity ends at event 906.

A check 908 can be produced to determine if a notice should automatically be generated that the opportunity is ending (e.g., a notice suggesting a user return to a first service). If a notice is to be generated, then production of the notice can take place through event 910. The notice can be informative or interactive—if the notice is interactive, then a response can be collected on how to proceed (e.g., return to first service, set a reminder, etc.).

With or without a notice, a check 914 can be performed to determine if there should be a return to the first service. If there is not a return to the first service, then there can be observation (e.g., continuous, periodic, etc.) that can take place at act 916 and there can be a return to check 914 to again determine if there should be a return. It is to be appreciated that other results can occur upon determining that there is not a return to service. For example, if there is not to be a return to a first multimedia service, then there can be a disengagement of the first multimedia service and the alternative multimedia service can become a new first multimedia service. If it is determined that there should be a return to the first service, then the determined service (e.g., alternative service) can be disabled at event 918 and there can be a return to the first service 920.

Figure 10:
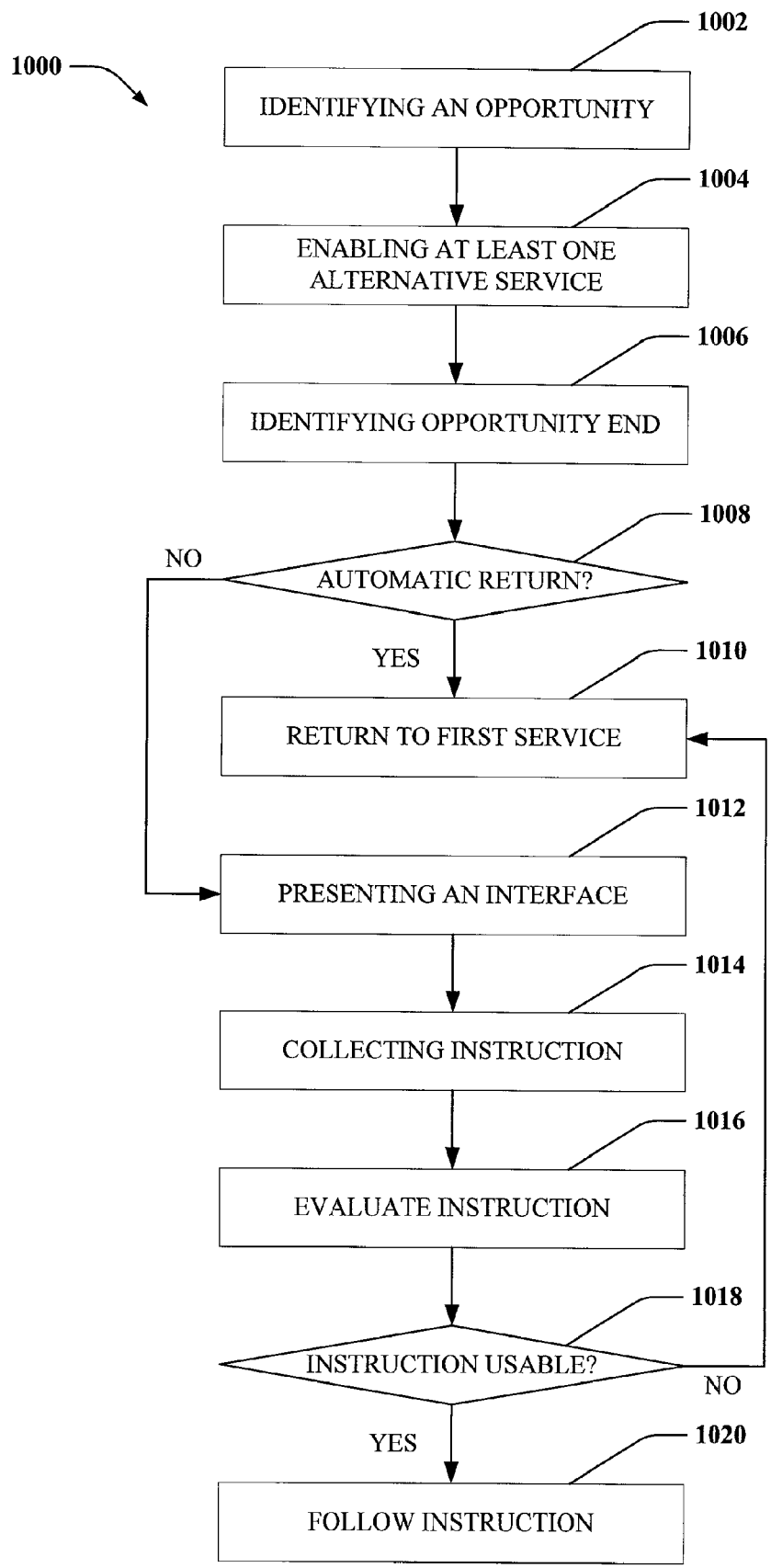
FIG. 10 is an illustration of a representative methodology for following user instruction for managing services of a mobile device in accordance with aspects disclosed herein.

Referring to FIG. 10, an example methodology 1000 is disclosed for engaging a user with regard to management of multimedia services. An opportunity can be identified at act 1002 and based upon the opportunity an alternative service can be enabled at action 1004. Monitoring of a first service associated with the opportunity can occur to identify an end to the opportunity at action 1006. For instance, identification of the end can be performed through a timing mechanism, such that the opportunity is anticipated to last a set length of time and that the amount of time is kept.

A check 1008 can take place to determine if there should be an automatic return to the first service; if a positive determination is made, then there can be a return to the first service at event 1010. However, if there is not to be an automatic return, then a user can be presented an interface on how to process an opportunity end at action 1012. Through the presented interface, an instruction can be collected at act 1014 on how to proceed with potential return to the first service.

The collected instruction can be evaluated through event 1016 in an attempt to determine what is intended from the instruction. The instruction can be evaluated through event 1016 and a check 1018 can be performed to determine if the instruction is usable (e.g., what the instruction asks to be done can be done). If the instruction cannot be used, then there can be automatic return to event 1010; if the instruction can be used, then the instruction is followed at act 1020 (e.g., which can include returning to the first service).

Referring to FIGS. 7-10, methodologies relating to user of various multi-media services are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

It will be appreciated that, in accordance with one or more aspects described herein, inferences and determinations can be made though employing artificial intelligence techniques. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include using artificial intelligence techniques. By way of further illustration, an inference can be made related to selecting a number of physical frames as a wakeup period parameter based upon intended application, desired power savings, etc. It will be appreciated that the foregoing examples are illustrative in nature and are not intended to limit the number of inferences that can be made or the manner in which such inferences are made in conjunction with the various embodiments and/or methods described herein.

Figure 11:
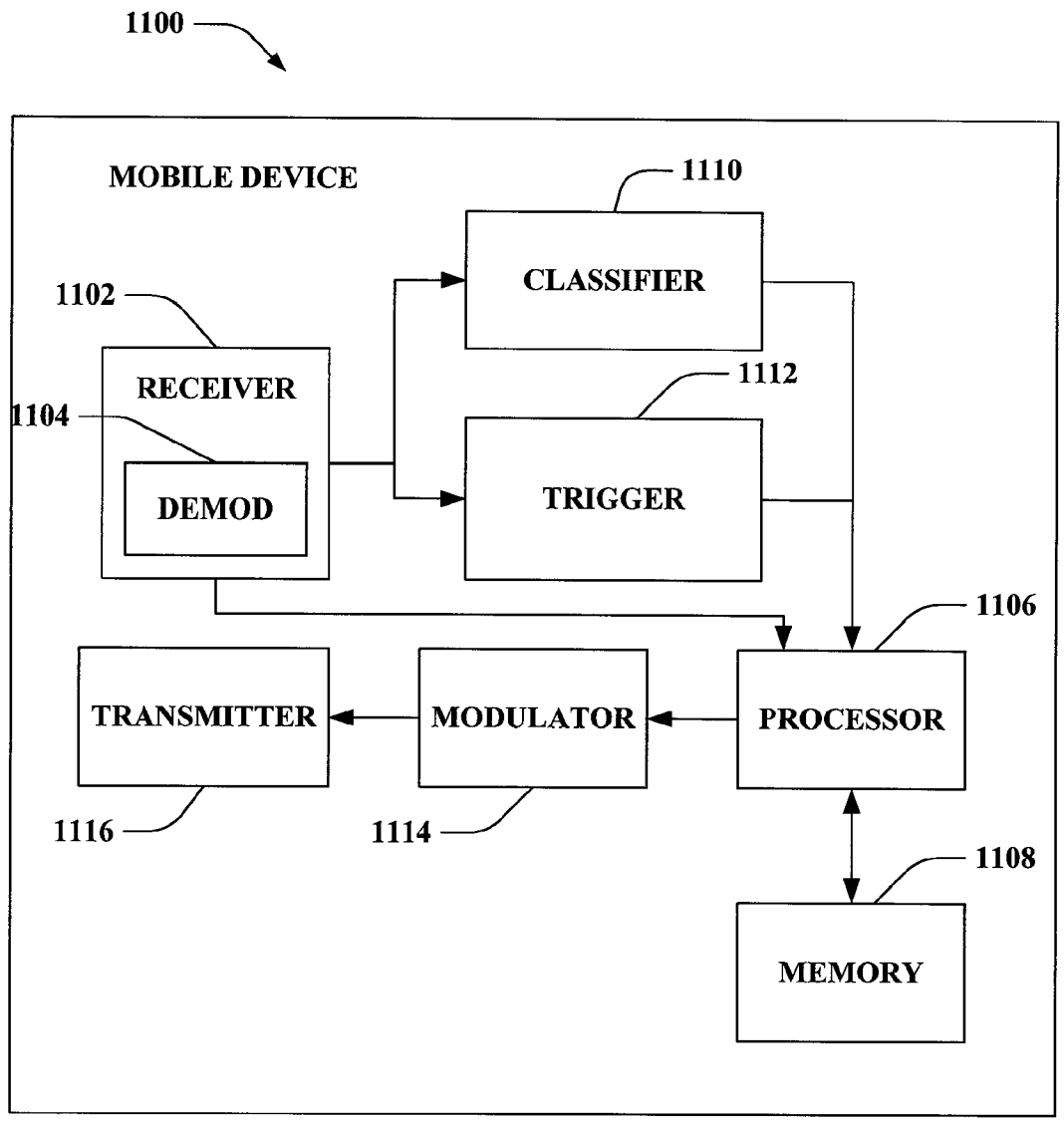
FIG. 11 is an illustration of an example mobile device that facilitates multimedia service management.

FIG. 11 is an illustration of a mobile device 1100 that facilitates employing multimedia services upon a mobile device 1100 (e.g., interchangeable with mobile device 202 of FIG. 2 or mobile device 122 or 128 of FIG. 1). Mobile device 1100 comprises a receiver 1102 that receives a signal from, for instance, a receive antenna (not shown), and performs typical actions thereon (e.g., filters, amplifies, downconverts, etc.) the received signal and digitizes the conditioned signal to obtain samples. Receiver 1102 can be, for example, an MMSE receiver, and can comprise a demodulator 1104 that can demodulate received symbols and provide them to a processor 1106 for channel estimation. Processor 1106 can be a processor dedicated to analyzing information received by receiver 1102 and/or generating information for transmission by a transmitter 1116, a processor that controls one or more components of mobile device 1100, and/or a processor that both analyzes information received by receiver 1102, generates information for transmission by transmitter 1116, and controls one or more components of mobile device 1100.

Mobile device 1100 can additionally comprise memory 1108 that is operatively coupled to processor 1106 and that can store data to be transmitted, received data, information related to available channels, data associated with analyzed signal and/or interference strength, information related to an assigned channel, power, rate, or the like, and any other suitable information for estimating a channel and communicating via the channel. Memory 1108 can additionally store protocols and/or algorithms associated with estimating and/or utilizing a channel (e.g., performance based, capacity based, etc.).

It will be appreciated that the data store (e.g., memory 1108) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1108 of the subject systems and methods is intended to comprise, without being limited to, these and any other suitable types of memory.

A classifier 1110 and/or a trigger 1112 can be used to facilitate operation concerning multiple services, particularly operated upon the mobile device 1100. The classifier 1110 can be used that identifies an opportunity of a first multimedia service. In addition, a trigger 1112 can be used that enables at least one alternative multimedia service based upon the identified opportunity. Mobile device 1100 still further comprises a modulator 1114 and a transmitter 1116 that transmits a signal (e.g., base CQI and differential CQI) to, for instance, a base station, another mobile device, etc. Although depicted as being separate from the processor 1106, it is to be appreciated that the classifier 1110 and/or trigger 1112 can be part of processor 1106 or a number of processors (not shown).

Figure 12:
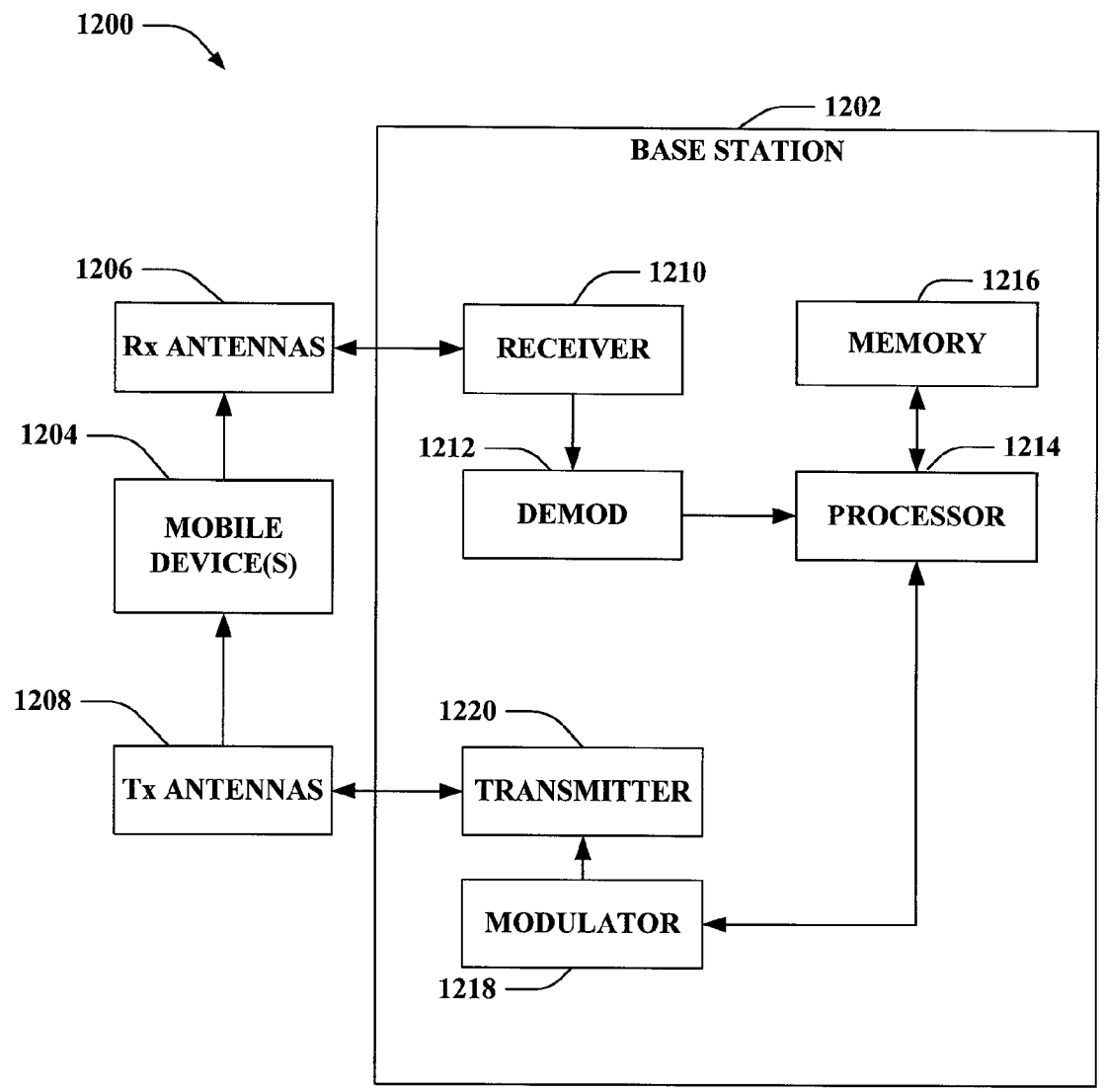
FIG. 12 is an illustration of an example system that facilitates engagement of a mobile device.

FIG. 12 is an illustration of a system 1200 that facilitates employing a mobile device for management of multiple multimedia services. System 1200 comprises a base station 1202 (e.g., access point, . . . ) with a receiver 1210 that receives signal(s) from one or more mobile devices 1204 through a plurality of receive antennas 1206, and a transmitter 1222 that transmits to the one or more mobile devices 1204 through a plurality of transmit antennas 1208. Receiver 1210 can receive information from receive antennas 1206 and is operatively associated with a demodulator 1212 that demodulates received information. Demodulated symbols are analyzed by a processor 1214 that can be similar to the processor described above with regard to FIG. 11, and which is coupled to a memory 1216 that stores information related to estimating a signal (e.g., pilot) strength and/or interference strength, data to be transmitted to or received from mobile device(s) 1204 (or a disparate base station (not shown)), and/or any other suitable information related to performing the various actions and functions set forth herein. Further, processor 1214 can effectuate transmitting over the forward link channel to convey a FLAB message or an ARB message. Information to be transmitted can be provided to a modulator 1218. Modulator 1218 can multiplex the information for transmission by a transmitter 1220 through antenna 1208 to mobile device(s) 1204.

Figure 13:
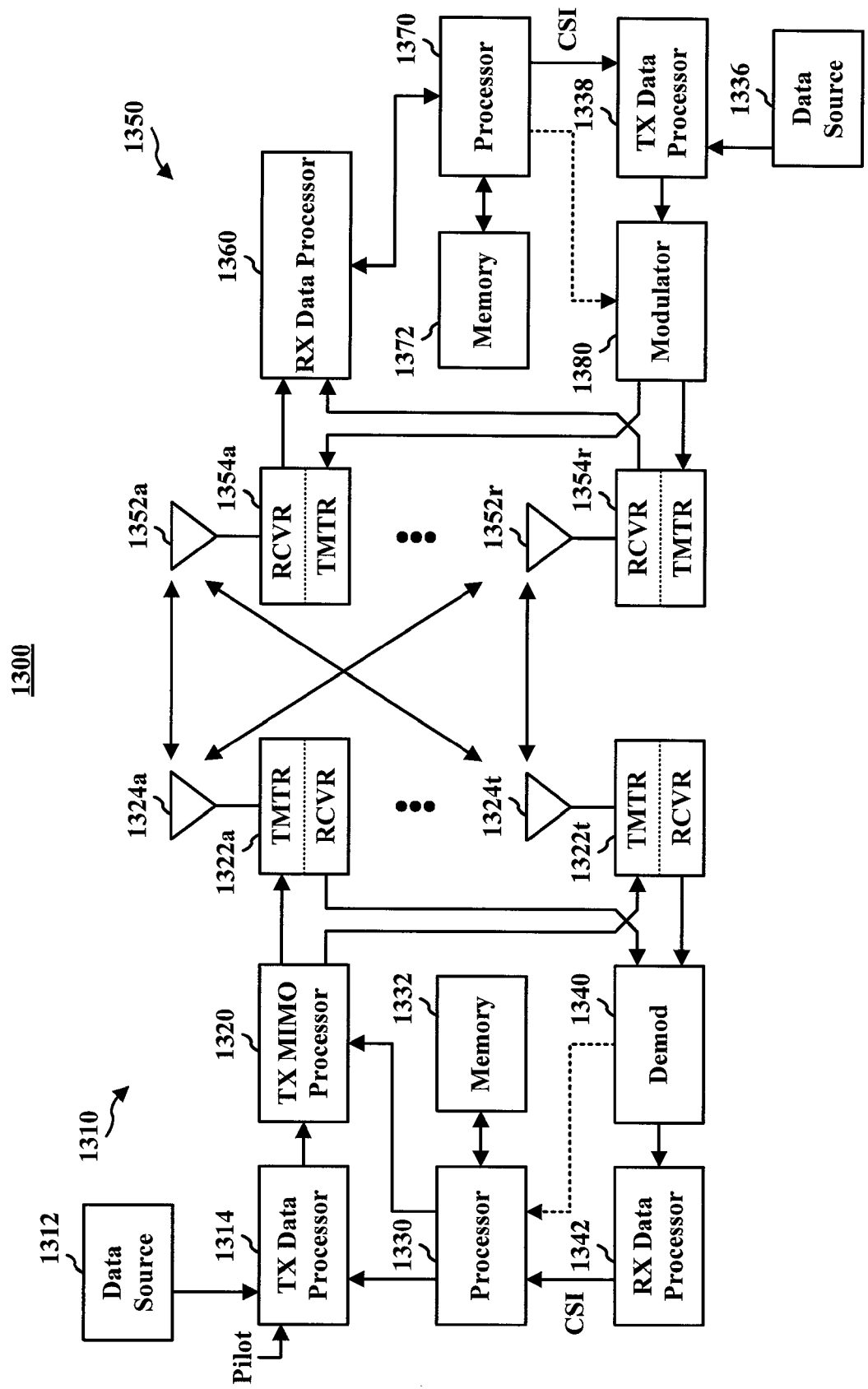
FIG. 13 is an illustration of an example wireless network environment that can be employed in conjunction with the various systems and methods described herein.

FIG. 13 shows an example wireless communication system 1300. The wireless communication system 1300 depicts one base station 1310 and one mobile device 1350 for sake of brevity. However, it is to be appreciated that system 1300 can include more than one base station and/or more than one mobile device, wherein additional base stations and/or mobile devices can be substantially similar or different from example base station 1310 and mobile device 1350 described below. In addition, it is to be appreciated that base station 1310 and/or mobile device 1350 can employ the systems (FIGS. 1-6 and 11-12) and/or methods (FIGS. 7-10) described herein to facilitate wireless communication there between.

At base station 1310, traffic data for a number of data streams is provided from a data source 1312 to a transmit (TX) data processor 1314. According to an example, each data stream can be transmitted over a respective antenna. TX data processor 1314 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1350 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1330.

The modulation symbols for the data streams can be provided to a TX MIMO processor 1320, which can further process the modulation symbols (e.g., for OFDM). TX MIMO processor 1320 then provides $N_T$ modulation symbol streams to $N_T$ transmitters (TMTR) 1322a through 1322t. In various embodiments, TX MIMO processor 1320 applies beamforming weights to the symbols of the data streams and to the antenna from which the symbol is being transmitted.

Each transmitter 1322 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1322a through 1322t are transmitted from $N_T$ antennas 1324a through 1324t, respectively.

At mobile device 1350, the transmitted modulated signals are received by $N_R$ antennas 1352a through 1352r and the received signal from each antenna 1352 is provided to a respective receiver (RCVR) 1354a through 1354r. Each receiver 1354 conditions (e.g., filters, amplifies, and downconverts) a respective signal, digitizes the conditioned signal to provide samples, and further processes the samples to provide a corresponding "received" symbol stream.

An RX data processor 1360 can receive and process the $N_R$ received symbol streams from $N_R$ receivers 1354 based on a particular receiver processing technique to provide $N_T$ "detected" symbol streams. RX data processor 1360 can demodulate, deinterleave, and decode each detected symbol stream to recover the traffic data for the data stream. The processing by RX data processor 1360 is complementary to that performed by TX MIMO processor 1320 and TX data processor 1314 at base station 1310.

A processor 1370 can periodically determine which preceding matrix to utilize as discussed above. Further, processor 1370 can formulate a reverse link message comprising a matrix index portion and a rank value portion.

The reverse link message can comprise various types of information regarding the communication link and/or the received data stream. The reverse link message can be processed by a TX data processor 1338, which also receives traffic data for a number of data streams from a data source 1336, modulated by a modulator 1380, conditioned by transmitters 1354a through 1354r, and transmitted back to base station 1310.

At base station 1310, the modulated signals from mobile device 1350 are received by antennas 1324, conditioned by receivers 1322, demodulated by a demodulator 1340, and processed by a RX data processor 1342 to extract the reverse link message transmitted by mobile device 1350. Further, processor 1330 can process the extracted message to determine which preceding matrix to use for determining the beamforming weights.

Processors 1330 and 1370 can direct (e.g., control, coordinate, manage, etc.) operation at base station 1310 and mobile device 1350, respectively. Respective processors 1330 and 1370 can be associated with memory 1332 and 1372 that store program codes and data. Processors 1330 and 1370 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 14:
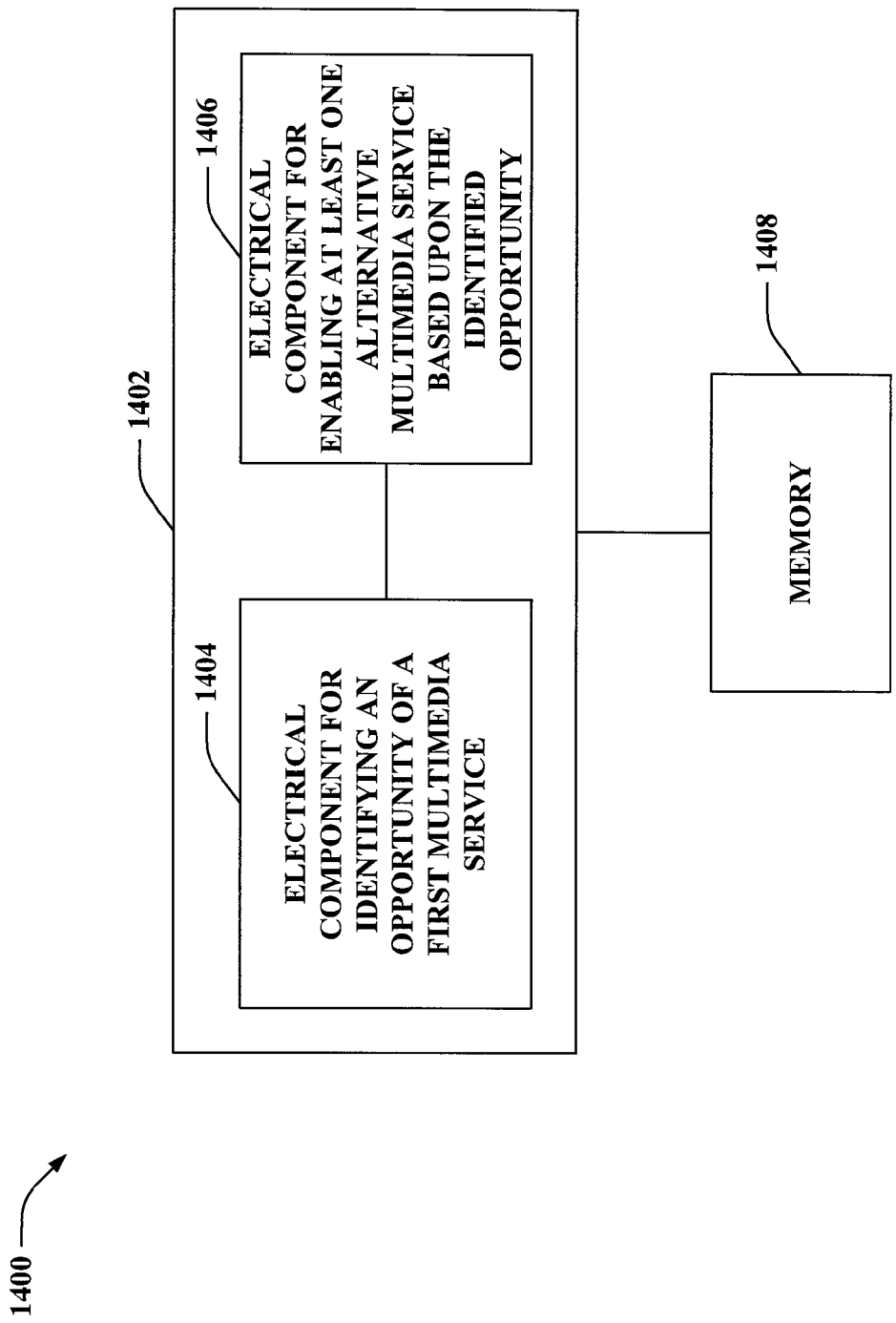
FIG. 14 is an illustration of an example system that manages various services upon a mobile device.

With reference to FIG. 14, illustrated is a system 1400 that effectuates reduce power consumption during periods of inactivity by operating in a reduce power mode for applications that intermix bursty traffic with inactivity. For example, system 1400 can reside at least partially within a mobile device. It is to be appreciated that system 1400 is represented as including functional blocks, which can be functional blocks that represent functions implemented by a processor, software, or combination thereof (e.g., firmware). System 1400 includes a logical grouping 1402 of electrical components that can act in conjunction. For instance, logical grouping 1402 can include an electrical component for identifying an opportunity of a first multimedia service 1404 as well as an electrical component for enabling at least one alternative multimedia service based upon the identified opportunity 1406. The logical grouping 1402 can also include and thus represent an electrical component for determining at least one alternative multimedia service to enable, an electrical component for evaluating the at least one alternative multimedia service, an electrical component for determining a manner of engagement for the at least one alternative multimedia service, an electrical component for establishing a modification of the first multimedia service such that the opportunity leaves an impression, an electrical component for generating an interface that enables selection of at least one of at least two enabled alternative multimedia services, an electrical component for identifying an end of the opportunity, an electrical component for determining how to proceed with regard to the at least one alternative multimedia service and the first multimedia service, an electrical component for disabling the at least one enabled alternative multimedia service, an electrical component for returning to the first multimedia service, an electrical component for collecting an instruction on how to proceed, an electrical component for following the instruction, and/or an electrical component for presenting an interface to a user that includes at least two choices, engagement of a choice by the user produces an instruction that is collected. Additionally, system 1400 can include a memory 1408 that retains instructions for executing functions associated with electrical components 1404 and 1406. While shown as being external to memory 1408, it is to be understood that one or more of electrical components 1404 and 1406 can exist within memory 1408.

The various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Additionally, at least one processor can comprise one or more modules operable to perform one or more of the steps and/or actions described above.

Further, the steps and/or actions of a method or algorithm described in connection with the aspects disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to the processor, such that the processor can read information from, and write information to, the storage medium. In the alternative, the storage medium can be integral to the processor. Further, in some aspects, the processor and the storage medium can reside in an ASIC. Additionally, the ASIC can reside in a user terminal. In the alternative, the processor and the storage medium can reside as discrete components in a user terminal. Additionally, in some aspects, the steps and/or actions of a method or algorithm can reside as one or any combination or set of codes and/or instructions on a machine readable medium and/or computer readable medium, which can be incorporated into a computer program product.

In one or more aspects, the functions described can be implemented in hardware, software, firmware, or any combination thereof. If implemented in software, the functions can be stored as one or more instructions or codes on a computer-readable medium, i.e., non-transitory computer-readable medium. Non-transitory computer-readable media includes computer storage media that facilitates transfer of a computer program from one place to another. A storage medium can be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of non-transitory computer-readable media.

What has been described above includes examples of one or more embodiments. It is, of course, not possible to describe every conceivable combination of components or methodologies for purposes of describing the aforementioned embodiments, but one of ordinary skill in the art can recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments can be described or claimed in the singular, the plural is contemplated unless limitation to the singular is explicitly stated. Additionally, all or a portion of any aspect and/or embodiment can be utilized with all or a portion of any other aspect and/or embodiment, unless stated otherwise.

What is claimed is:

1. A method for multimedia service management operable upon a wireless communication device, comprising:
   identifying a break opportunity during a presentation of a first multimedia service to present an alternative multimedia service, wherein the first multimedia service comprises an advertisement for presentment to a user during the identified break opportunity, and wherein the advertisement comprises at least one of video content associated with the advertisement and audio content associated with the advertisement;
   determining a manner to present the alternative multimedia service by collecting and analyzing contextual information of the first multimedia service;
   enabling presentation of the alternative multimedia service only during the identified break opportunity; and
   presenting the advertisement to the user simultaneously with the enabled presentation of the alternative multimedia service, wherein presenting the advertisement comprises one of displaying the video content associated with the advertisement and outputting the audio content associated with the advertisement.

2. The method of claim 1, further comprising determining the alternative multimedia service to enable.

3. The method of claim 1, wherein the break opportunity relates to a time period to disclose the advertisement.

4. The method of claim 3, further comprising:
   evaluating the alternative multimedia service; and
   modifying the first multimedia service such that the break opportunity leaves an impression.

5. The method of claim 1, further comprising generating an interface that enables selection of at least one of at least two enabled alternative multimedia services.

6. The method of claim 1, further comprising:
   identifying an end of the break opportunity; and
   determining how to proceed with regard to the alternative multimedia service and the first multimedia service.

7. The method of claim 6, wherein determining how to proceed with regard to the alternative multimedia service and the first multimedia service comprises resuming display of video content and output of audio content of the first multimedia service upon the identified end.

8. The method of claim 7, further comprising:
   disabling the enabled alternative multimedia service; and
   returning to the first multimedia service.

9. The method of claim 6, wherein determining how to proceed with regard to the alternative multimedia service and the first multimedia service further comprises:
   collecting an instruction on how to proceed; and
   following the instruction.

10. The method of claim 9, further comprising presenting an interface to the user that includes at least two choices, wherein engagement of a choice by the user produces the instruction that is collected.

11. A mobile device configured for multimedia service management, comprising:
    a processor configured with software instructions to perform operations comprising:
       identifying a break opportunity during a presentation of a first multimedia service to present an alternative multimedia service, wherein the first multimedia service comprises an advertisement for presentment to a user during the identified break opportunity, and wherein the advertisement comprises at least one of video content associated with the advertisement and audio content associated with the advertisement;
       determining a manner to present the alternative multimedia service by collecting and analyzing contextual information of the first multimedia service;
       enabling presentation of the alternative multimedia service only during the identified break opportunity; and
       presenting the advertisement to the user simultaneously with the enabled presentation of the alternative multimedia service, wherein presenting the advertisement comprises one of displaying the video content associated with the advertisement and outputting the audio content associated with the advertisement.

12. The mobile device of claim 11, wherein the processor is configured with software instructions to perform operations further comprising:
    determining the alternative multimedia service to enable.

13. The mobile device of claim 11, wherein the processor is configured with software instructions to perform operations such that the break opportunity relates to a time period to disclose the advertisement.

14. The mobile device of claim 13, wherein the processor is configured with software instructions to perform operations further comprising:
    evaluating the alternative multimedia service; and
    modifying the first multimedia service such that the break opportunity leaves an impression.

15. The mobile device of claim 11, wherein the processor is configured with software instructions to perform operations further comprising:
    generating an interface that enables selection of at least one of at least two enabled alternative multimedia services.

16. The mobile device of claim 11, wherein the processor is configured with software instructions to perform operations further comprising:
   identifying an end of the break opportunity; and
   determining how to proceed with regard to the alternative multimedia service and the first multimedia service.

17. The mobile device of claim 16, wherein the processor is configured with software instructions to perform operations such that determining how to proceed with regard to the alternative multimedia service and the first multimedia service comprises resuming display of video content and output of audio content of the first multimedia service upon the identified end.

18. The mobile device of claim 17, wherein the processor is configured with software instructions to perform operations further comprising:
   disabling the enabled alternative multimedia service; and
   returning to the first multimedia service.

19. The mobile device of claim 16, wherein the processor is configured with software instructions to perform operations such that determining how to proceed with regard to the alternative multimedia service and the first multimedia service further comprises:
   collecting an instruction on how to proceed; and
   following the instruction.

20. The mobile device of claim 19, wherein the processor is configured with software instructions to perform operations further comprising:
   presenting an interface to the user that includes at least two choices, wherein engagement of a choice by the user produces the instruction that is collected.

21. A non-transitory computer-readable medium having stored therein processor-executable instructions configured to cause a processor to perform operations comprising:
   identifying a break opportunity during a presentation of a first multimedia service to present an alternative multimedia service, wherein the first multimedia service comprises an advertisement for presentment to a user during the identified break opportunity, and wherein the advertisement comprises at least one of video content associated with the advertisement and audio content associated with the advertisement;
   determining a manner to present the alternative multimedia service by collecting and analyzing contextual information of the first multimedia service;
   enabling presentation of the alternative multimedia service only during the identified break opportunity; and
   presenting the advertisement to the user simultaneously with the enabled presentation of the alternative multimedia service, wherein presenting the advertisement comprises one of displaying the video content associated with the advertisement and outputting the audio content associated with the advertisement.

22. The non-transitory computer-readable medium of claim 21, wherein the stored processor-executable instructions are configured to cause the processor to perform operations further comprising:
   determining the alternative multimedia service to enable.

23. The non-transitory computer-readable medium of claim 21, wherein the stored processor-executable instructions are configured to cause the processor to perform operations such that the break opportunity relates to a time period to disclose the advertisement.

24. The non-transitory computer-readable medium of claim 23, wherein the stored processor-executable instructions are configured to cause the processor to perform operations further comprising:
   evaluating the alternative multimedia service; and
   modifying the first multimedia service such that the break opportunity leaves an impression.

25. The non-transitory computer-readable medium of claim 21, wherein the stored processor-executable instructions are configured to cause the processor to perform operations further comprising:
   generating an interface for a selection of at least one of at least two enabled alternative multimedia services.

26. The non-transitory computer-readable medium of claim 21, wherein the stored processor-executable instructions are configured to cause the processor to perform operations further comprising:
   identifying an end of the break opportunity; and
   determining how to proceed with regard to the alternative multimedia service and the first multimedia service.

27. The non-transitory computer-readable medium of claim 26, wherein the stored processor-executable instructions are configured to cause the processor to perform operations such that determining how to proceed with regard to the alternative multimedia service and the first multimedia service comprises resuming display of video content and output of audio content of the first multimedia service upon the identified end.

28. The non-transitory computer-readable medium of claim 27, wherein the stored processor-executable instructions are configured to cause the processor to perform operations further comprising:
   disabling the enabled alternative multimedia service; and
   returning to the first multimedia service.

29. The non-transitory computer-readable medium of claim 26, wherein the stored processor-executable instructions are configured to cause the processor to perform operations such that determining how to proceed with regard to the alternative multimedia service and the first multimedia service further comprises:
   collecting an instruction on how to proceed; and
   following the instruction.

30. The non-transitory computer-readable medium of claim 29, wherein the stored processor-executable instructions are configured to the processor to perform operations further comprising:
   presenting an interface to the user that includes at least two choices, wherein engagement of a choice by the user produces the instruction that is collected.

31. An apparatus, comprising:
   means for identifying a break opportunity during a presentation of a first multimedia service to present an alternative multimedia service, wherein the first multimedia service comprises an advertisement for presentment to a user during the identified break opportunity, and wherein the advertisement comprises at least one of video content associated with the advertisement and audio content associated with the advertisement;
   means for determining a manner to present the alternative multimedia service by collecting and analyzing contextual information of the first multimedia service;
   means for enabling presentation of the alternative multimedia service only during the identified break opportunity; and
   means for presenting the advertisement to the user simultaneously with the enabled presentation of the alternative multimedia service, wherein presenting the advertisement comprises one of displaying the video content associated with the advertisement and outputting the audio content associated with the advertisement.

32. The apparatus of claim 31, further comprising means for determining the alternative multimedia service to enable.

33. The apparatus of claim 31, wherein the break opportunity relates to a time period to disclose the advertisement.

34. The apparatus of claim 33, further comprising:
means for evaluating the at least one alternative multimedia service; and
means for modifying the first multimedia service such that the break opportunity leaves an impression.

35. The apparatus of claim 31, further comprising means for generating an interface that enables selection of at least one of at least two enabled alternative multimedia services.

36. The apparatus of claim 31, further comprising:
means for identifying an end of the break opportunity; and
means for determining how to proceed with regard to the alternative multimedia service and the first multimedia service.

37. The apparatus of claim 36, wherein determining how to proceed with regard to the alternative multimedia service and the first multimedia service comprises resuming display of video content and output of audio content of the first multimedia service upon the identified end.

38. The apparatus of claim 37, further comprising:
means for disabling the enabled alternative multimedia service; and
means for returning to the first multimedia service.

39. The apparatus of claim 36, means for determining how to proceed with regard to the alternative multimedia service and the first multimedia service further comprises:
means for collecting an instruction on how to proceed; and
means for following the instruction.

40. The apparatus of claim 39, further comprising means for presenting an interface to the user that includes at least two choices, wherein engagement of a choice by the user produces the instruction that is collected.

41. An apparatus, comprising:
a classifier that identifies a break opportunity during a presentation of a first multimedia service to present an alternative multimedia service, wherein the first multimedia service comprises an advertisement for presentment to a user during the identified break opportunity, and wherein the advertisement comprises at least one of video content associated with the advertisement and audio content associated with the advertisement;
a calculator that determines a manner to present the alternative multimedia service by collecting and analyzing contextual information of the first multimedia service; and
a trigger that enables the alternative multimedia service to operate only during the identified break opportunity, the trigger also presents the advertisement to the user simultaneously with the enabled alternative multimedia service, wherein presenting the advertisement comprises one of displaying the video content associated with the advertisement and outputting the audio content associated with the advertisement.

42. The apparatus of claim 41, further comprising a viewer that determines the alternative multimedia service to enable.

43. The apparatus of claim 41, wherein the break opportunity relates to a time period to disclose the advertisement.

44. The apparatus of claim 43, further comprising:
an appraiser that evaluates the alternative multimedia service; and
a changer that modifies the first multimedia service such that the break opportunity leaves an impression.

45. The apparatus of claim 41, further comprising a producer that generates an interface that enables selection of at least one of at least two enabled alternative multimedia services.

46. The apparatus of claim 41, further comprising:
a terminator that identifies an end of the break opportunity; and
a developer that determines how to proceed with regard to the alternative multimedia service and the first multimedia service.

47. The apparatus of claim 46, wherein the developer that determines how to proceed with regard to the alternative multimedia service and, wherein the first multimedia service comprises a displayer that resumes display of video content and speakers that resumes output of audio content of the first multimedia service upon the identified end.

48. The apparatus of claim 47, further comprising:
an immobilizer that disables the enabled alternative multimedia service; and
a reviser that returns to the first multimedia service.

49. The apparatus of claim 46, wherein the developer that determines how to proceed with regard to the alternative multimedia service and, wherein the first multimedia service comprises:
an obtainer that collects an instruction on how to proceed; and
an attempter that follows the instruction.

50. The apparatus of claim 49, further comprising a discloser that presents an interface to the user that includes at least two choices, wherein engagement of a choice by the user produces the instruction that is collected.

* * * * *